United States Patent [19]

Kennedy

[11] 4,425,286
[45] Jan. 10, 1984

[54] PROCESS AND APPARATUS FOR PRODUCING POWDERED METAL

[75] Inventor: Richard L. Kennedy, Monroe, N.C.

[73] Assignee: Teledyne Industries, Inc., Monroe, N.C.

[21] Appl. No.: 234,732

[22] Filed: Feb. 17, 1981

[51] Int. Cl.³ .............................................. B01J 2/02
[52] U.S. Cl. ...................................................... 264/8
[58] Field of Search ........................................... 264/8

[56] References Cited

U.S. PATENT DOCUMENTS

| | | | |
|---|---|---|---|
| 2,211,775 | 8/1940 | Haunz | 427/399 |
| 2,816,826 | 12/1957 | Brennan | 264/8 |
| 2,994,102 | 8/1961 | Payton | 264/8 |
| 3,241,948 | 3/1966 | Claiborne et al. | 264/12 |
| 3,246,982 | 4/1966 | Moritz et al. | 264/8 |
| 3,466,352 | 9/1969 | Corbett | 264/8 |
| 3,504,062 | 3/1970 | Bachowski | 264/13 |
| 3,532,775 | 10/1970 | Brondyke et al. | 264/7 |
| 3,537,695 | 11/1970 | Robinson, Jr. et al. | 266/204 |
| 3,699,196 | 10/1972 | Joyce et al. | 264/6 |
| 3,720,737 | 3/1973 | Klaphaak et al. | 264/8 |
| 3,797,978 | 3/1974 | Young et al. | 425/8 |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |

OTHER PUBLICATIONS

D. Apelian, R. Mehrabian & M. C. Flemings, "Solidification Research", Structure & Property Control Through Rapid Quenching of Metals, Semi-Annual Tech. Rep., No. 4, (Jan. 1, 1972–Jul. 31, 1972), Mass. Ins. of Tech., Cambridge, Mass., pp. 22–51.

*Primary Examiner*—James R. Hall
*Attorney, Agent, or Firm*—Bell, Seltzer, Park & Gibson

[57] ABSTRACT

Powdered metal of improved cleanliness and uniformity of particle size is produced by directing a stream of the molten metal into a container having peripherial walls formed of a porous material, such as ceramic foam, having a network of fine passageways extending therethrough. The container is rotated to centrifugally force the molten metal through the porous peripherial walls of the container and to eject the molten metal from the container in the form of fine droplets while inclusions present in the molten metal are filtered and retained in the porous ceramic material, and whereby a metal powder is formed upon cooling and solidifying of the droplets.

2 Claims, 3 Drawing Figures

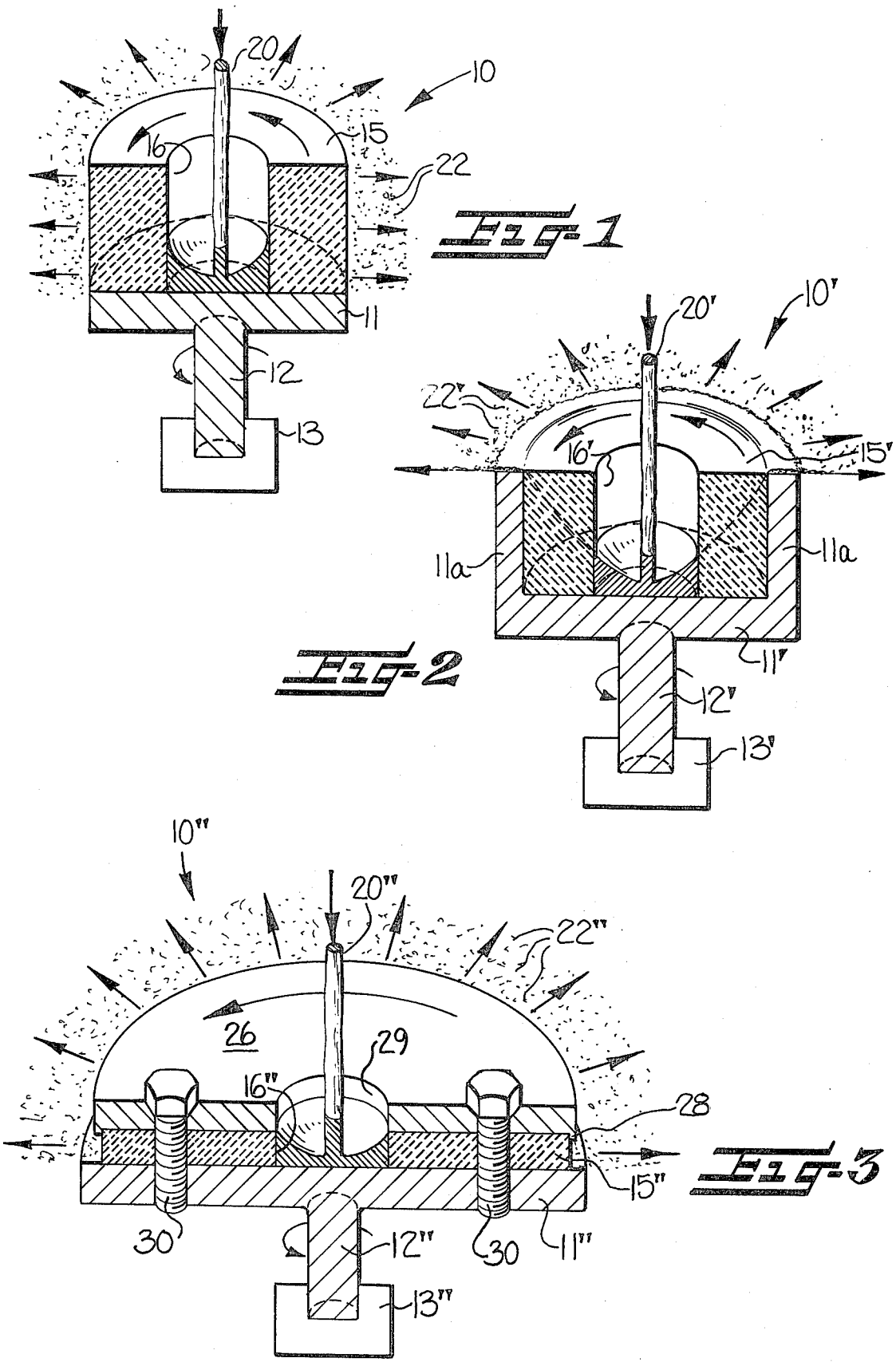

PROCESS AND APPARATUS FOR PRODUCING POWDERED METAL

The invention is directed to a process and apparatus for making metal powder directly from molten metal.

The present invention is generally applicable to any metal or alloy, but is particularly suited for making powders from costly metals and alloys such as the superalloys.

There are currently three principal commercial processes by which powder is made from superalloys:

(1) Inert Gas Atomization—A molten metal stream is broken up by a high pressure blast of gas, usually an inert gas such as argon or helium.

(2) Rotating Electrode—An arc is struck between a rotating rod of metal or alloy and an inert substance. Metal particles (powder) fly off as the electrode melts.

(3) Soluble Gas Atomization—Powder is formed by exposing a molten metal with a high amount of dissolved gas to a vacuum. Powder particles form from the rapid "explosion" of the gas coming out of solution.

All of the above-noted commercial processes suffer cleanliness problems. Powders manufactured by these processes contain small ceramic inclusions inherent in the melting process. In high strength superalloys, such inclusions serve as initiation sites for low cycle fatigue cracking, thus limiting the useful life of parts made from such powders.

The only known solution to this problem, currently being used for critical aircraft components made from superalloy powder, involves screening to a very fine powder size which would be below the critical defect size, e.g. −150 mesh (0.111 mm) or −325 (0.044 mm). This procedure is very costly however, since only a very small fraction of the powder produced by any of the currently known manufacturing processes is of the required fineness, and low yields and productivity result.

With the foregoing in mind, it is an object of the present invention to provide a process and apparatus for making metal powder which is of improved cleanliness as compared to current commercially available powders.

It is a further object of this invention to provide a process and apparatus for making metal powder of a more closely controlled particle size range, such that significantly increased yields may be obtained.

In accordance with the present invention, molten metal is directed into a container having peripheral walls formed of a porous material, such as ceramic foam, having a network of fine passageways extending therethrough and the container is rotated to centrifugally force the molten metal through the porous peripheral walls of the container and to eject the molten metal from the container in the form of fine droplets. The porous material acts as a filter to trap and retain impurities (inclusions) present in the molten metal. Additionally, a higher degree of control over the powder particle size is provided, as compared to existing methods, by means of simple controls such as selection of the rotational speed and pore size of the porous material.

Some of the features and advantages of the invention having been described, others will become apparent as the description proceeds, when taken in connection with the accompanying drawings, in which—

FIG. 1 is a cross sectional perspective view of one embodiment of apparatus is accordance with the invention;

FIG. 2 is a cross sectional perspective view of a second embodiment of apparatus in accordance with the invention: and FIG. 3 is a cross sectional perspective view of a third embodiment of apparatus in accordance with the invention.

Referring now more particularly to FIG. 1, the apparatus includes a rotatable container, generally indicated at 10. The container 10 includes a solid circular base plate 11 having a shaft 12 extending vertically from the underside thereof. The shaft is connected to a suitable drive, schematically indicated at 13, adapted for rotating the container 10 at a desired rotational speed.

An annular shaped block of porous ceramic material 15 is carried by the upper surface of the base plate 11 and defines the peripheral side walls of the rotatable container 10. The ceramic material 15 has a central bore or hole 16 adapted for receiving the molten metal. The porous ceramic material 15 preferably comprises a ceramic foam having an open-cell structure with a multiplicity of interconnected voids defining a network of fine passageways extending through the material and rendering the material permeable and highly effective as a filter medium for molten metals. By way of example, suitable porous ceramic materials for use in the present invention are disclosed in U.S. Pat. Nos. 3,893,917, 3,947,363, 3,962,081.

In producing metal powder in accordance with the invention, a stream 20 of hot molten metal is directed downwardly to the central bore 16 of the porous ceramic material 15. At the same time, the container 10 is rotated so as to centrifugally force the molten metal which is received in the bore 16 outwardly through the porous peripheral walls 15, and the molten metal is ejected from the porous walls in the form of fine droplets. The droplets of molten metal cool and solidifying into fine particles 22 of relatively uniform size and are collected by suitable means, not shown.

The size of the particles 22 can be effectively controlled within a desired range by suitable selection of the pore size of the porous ceramic material 15 and by controlling the speed of rotation of the rotatable container 10. As the molten metal passes through the porous peripheral walls of the container, impurities present in the molten metal are filtered and retained in the porous ceramic material, so that the droplets which pass through the walls and are formed into metal powder are essentially free of undesirable inclusions. Thus, not only does the process provide higher degree of control over the powder particle size and resulting increased yields, as compared to the metal powder process presently known, but in addition, the cleanliness of the metal powder is significantly enhanced.

FIG. 2 illustrates an alternate embodiment of apparatus for carrying out the process of the present invention. The elements of the apparatus shown in FIG. 2 are similar in many respects to that previously described in connection with FIG. 1, and to avoid repetitive description, corresponding elements will be identified with the same reference characters, wherever applicable, with prime (') notation added.

As illustrated, the rotatable container 10' is in the form of a supporting cup having a solid circular bottom wall 11' and solid peripheral side walls 11a carried by the bottom wall 11' and extending upwardly therefrom.

As in the previous embodiment, a shaft 12' extends axially downwardly from the underside of the bottom wall 11' to permit rotation of the container. The annular shaped porous ceramic material 15' is positioned within and supported by the surrounding solid side walls 11a and includes an axial bore or hole 16' for receiving the molten metal therein. When a stream 20' of molten metal is poured into the central bore 16' during rotation of the rotatable container 10', the molten metal is forced centrifugally outwardly and upwardly, passing through the porous walls of the ceramic material 15, and over the upper edge of the solid side wall 11a, being centrifugally ejected from the container in the form of fine droplets. Inclusions present in the molten metal are filtered and retained in the ceramic material 15'.

FIG. 3 illustrates still another embodiment of apparatus in accordance with the present invention. To avoid repetitive description, elements of the apparatus of FIG. 3 which correspond to elements previously described will, wherever applicable, be identified by corresponding reference characters, with double prime (") notation added.

As illustrated, the rotatable container 10" comprises a circular solid base plate 11" having an axially extending shaft 12" connected to suitable drive means 13" for imparting rotation to the container. The porous ceramic material 15" is positioned overlying the upper surface of the base plate 11 and is of an annular shape with a central opening 16" for receiving the molten metal. A circular cover plate 26 is positioned overlying the ceramic foam material 15" for holding the ceramic material 15" in place. As illustrated, the cover plate has a downwardly projecting peripheral lip or flange 28 adapted for engaging the outer peripheral surface of the foam material 15" to assist in holding and retaining the foam material in place. The cover plate has a central opening 29 located in axial alignment with the bore 16" of the ceramic material for allowing the stream 20" of molten metal to be poured into the center of the container 10". The cover plate 26 is secured to the base plate 11" by suitable means, such as bolts 30.

During operation, the container 10" is rotated at the desired rotational speed while a stream 20" of molten metal is poured into the center of the container. The molten metal is centrifugally forced outwardly through the porous material 15" and is ejected from the outer periphery of the porous material 15" in the form of fine droplets which cool and solidify into metal powder.

In the drawings and specifications, there have been set forth preferred embodiments of the invention, and althought specific terms are employed, they are used in a generic and descriptive sense only and not for purposes of limitation.

That which is claimed is:

1. A continuous process for producing powdered metal of substantially uniform practice size and substantially free from inclusions, said process comprising continuously directing a stream of molten metal downwardly into a container having peripheral walls formed of a porous material having a multiplicity of interconnected voids defining a network of fine passageways extending through the peripheral wall, rotating the container at such a rate as to centrifugally force the molten metal through the network of fine passageways of the porous peripheral walls of the container and to filter out and retain in the porous walls inclusions present in the molten metal and to continuously eject the molten metal centrifugally outwardly from the container in the form of fine droplets, and cooling the droplets of molten metal ejected from the container to solidify the same into a metal powder.

2. A continuous process for producing a superalloy powder of substantially uniform particle size and substantially free from inclusions, said process comprising continuously directing a stream of molten superalloy containing small ceramic inclusions inherent in the melting process downwardly into a container having peripheral walls formed of a porous material having a multiplicity of interconnected voids defining a network of fine passageways extending through the peripheral walls, rotating the container at such a rate as to centrifugally force the molten superalloy through the network of fine passageways of the porous peripheral walls of the container and to filter out and retain in the porous walls the inclusions present in the molten superalloy and to continuously eject the molten superalloy centrifugally outwardly from the container in the form of fine droplets, and cooling the droplets of molten superalloy ejected from the container to solidify the same into a superalloy powder.

* * * * *

UNITED STATES PATENT AND TRADEMARK OFFICE
CERTIFICATE OF CORRECTION

PATENT NO. : 4,425,286
DATED : January 10, 1984
INVENTOR(S) : Richard L. Kennedy It is certified that error appears in the above-identified patent and that said Letters Patent is hereby corrected as shown below:

Column 4, Line 5 "althought" should be -- although --.

Column 4, Line 10 "practice" should be -- particle --.

Signed and Sealed this

Seventeenth Day of April 1984

[SEAL]

Attest:

GERALD J. MOSSINGHOFF

Attesting Officer   Commissioner of Patents and Trademarks